US010900416B2

(12) United States Patent
Choi

(10) Patent No.: US 10,900,416 B2
(45) Date of Patent: Jan. 26, 2021

(54) GAS TURBINE SYSTEM AND CONTROL APPARATUS AND METHOD THEREOF

(71) Applicant: DOOSAN HEAVY INDUSTRIES & CONSTRUCTION CO., LTD., Changwon-si (KR)

(72) Inventor: Byung Hee Choi, Yongin-si (KR)

(73) Assignee: Doosan Heavy Industries Construction Co., Ltd, Gyeongsangnam-do (KR)

( * ) Notice: Subject to any disclaimer, the term of this patent is extended or adjusted under 35 U.S.C. 154(b) by 370 days.

(21) Appl. No.: 15/939,290

(22) Filed: Mar. 29, 2018

(65) Prior Publication Data
US 2018/0306111 A1    Oct. 25, 2018

(30) Foreign Application Priority Data
Apr. 24, 2017    (KR) .................. 10-2017-0052387

(51) Int. Cl.
*F02C 7/047* (2006.01)
*F02C 9/20* (2006.01)
(Continued)

(52) U.S. Cl.
CPC .............. *F02C 7/047* (2013.01); *F01D 25/02* (2013.01); *F02C 9/20* (2013.01); *F02C 9/26* (2013.01);
(Continued)

(58) Field of Classification Search
CPC .......... F01D 25/02; F01D 21/003; F02C 7/08; F02C 7/047; F02C 7/22; F02C 9/18;
(Continued)

(56) References Cited

U.S. PATENT DOCUMENTS 3,705,491 A * 12/1972 Foster-Pegg .......... F01K 21/042
                                                      60/39.55
4,831,819 A *  5/1989 Norris ..................... B64D 15/22
                                                      244/134 R
(Continued)

FOREIGN PATENT DOCUMENTS

JP            06323542 A      11/1994
JP         2001173459 A       6/2001
(Continued)

OTHER PUBLICATIONS

A Japanese Notification of Reasons for Refusal dated Feb. 26, 2019 in connection with Japanese Patent Application No. 2018-044923.
(Continued)

*Primary Examiner* — Jason H Duger
(74) *Attorney, Agent, or Firm* — INVENSTONE Patent, LLC

(57) ABSTRACT

A gas turbine system, and a control apparatus and method thereof, can control the amount of compressed air supplied to each of a combustor and an anti-icing unit in order to improve the droop control performance of the gas turbine system. The control apparatus of the gas turbine system may include a sensing unit to measure a rotor speed of the turbine; and a compressed air distribution unit to adjust a distribution ratio of the compressed air supplied to the combustor to the compressed air supplied to the anti-icing unit, based on the measured rotor speed. The control apparatus can increase the amount of compressed air supplied to the combustor even though the revolution number of the turbine connected with a system frequency may be significantly lowered.

7 Claims, 6 Drawing Sheets

(51) Int. Cl.
*F01D 25/02* (2006.01)
*F02C 9/26* (2006.01)

(52) U.S. Cl.
CPC .. *F05D 2270/303* (2013.01); *F05D 2270/304* (2013.01)

(58) Field of Classification Search
CPC ...... F02C 9/20; F02C 9/26; F02C 9/28; F02C 9/52; F05D 2270/303; F05D 2270/304
See application file for complete search history.

(56) References Cited

U.S. PATENT DOCUMENTS

| | | | |
|---|---|---|---|
| 6,226,974 B1 * | 5/2001 | Andrew | F02C 9/28 60/772 |
| 6,779,346 B2 * | 8/2004 | Nichols | F02C 9/52 60/782 |
| 8,220,275 B2 * | 7/2012 | Tillery | F01D 25/10 60/778 |
| 9,745,896 B2 * | 8/2017 | Crothers | F02C 9/18 |
| 10,066,632 B2 * | 9/2018 | Klosinski | F04D 27/0276 |
| 2015/0059353 A1 * | 3/2015 | Asai | F02C 3/22 60/778 |
| 2015/0377126 A1 * | 12/2015 | Harper | F02C 6/08 60/782 |
| 2016/0348592 A1 | 12/2016 | Dierkes et al. | |
| 2016/0348690 A1 | 12/2016 | Larson et al. | |
| 2018/0100442 A1 * | 4/2018 | Mathai | F04D 27/0261 |

FOREIGN PATENT DOCUMENTS

| | | |
|---|---|---|
| JP | 2004132255 A | 4/2004 |
| JP | 3713173 B2 | 11/2005 |
| JP | 2016037883 A | 3/2016 |
| JP | 2017061879 A | 3/2017 |
| KR | 20160091416 A | 8/2016 |

OTHER PUBLICATIONS

An European Search Report dated Sep. 25, 2018 in connection with European Patent Application No. 18168803.7.

* cited by examiner

[FIG. 1]
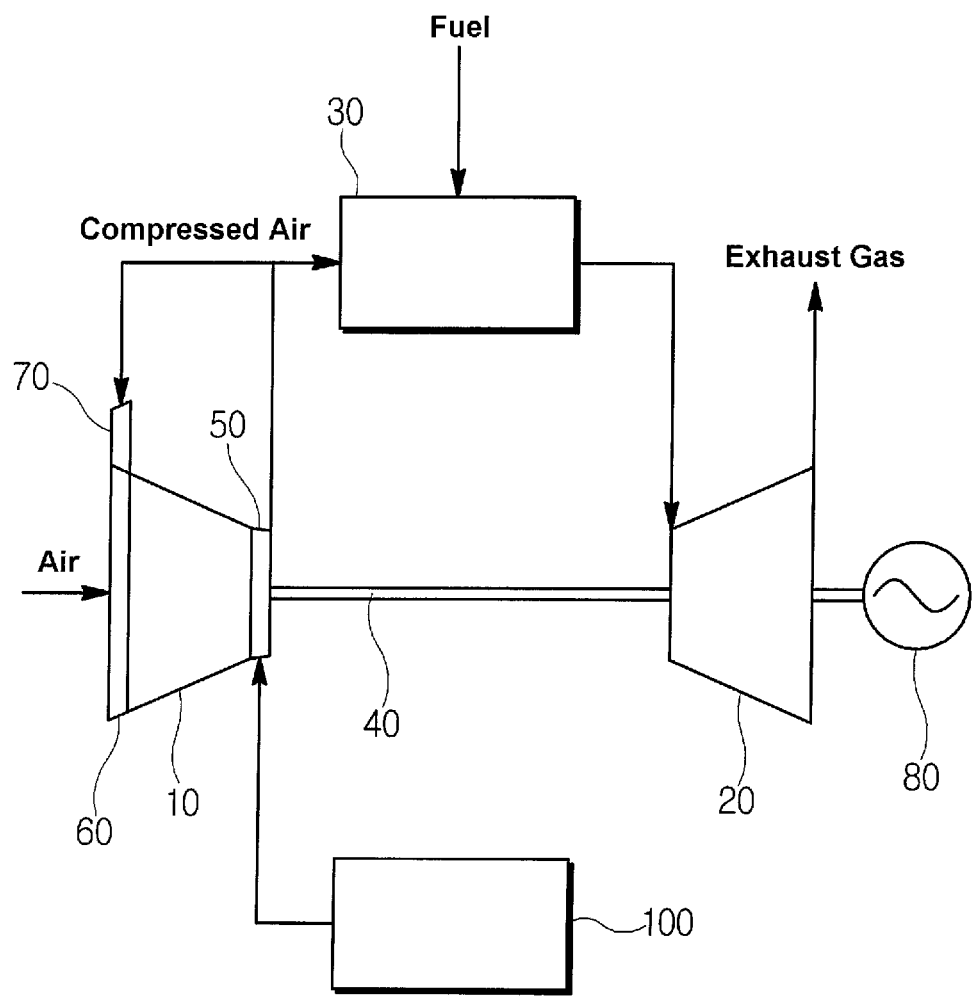

[FIG. 2]
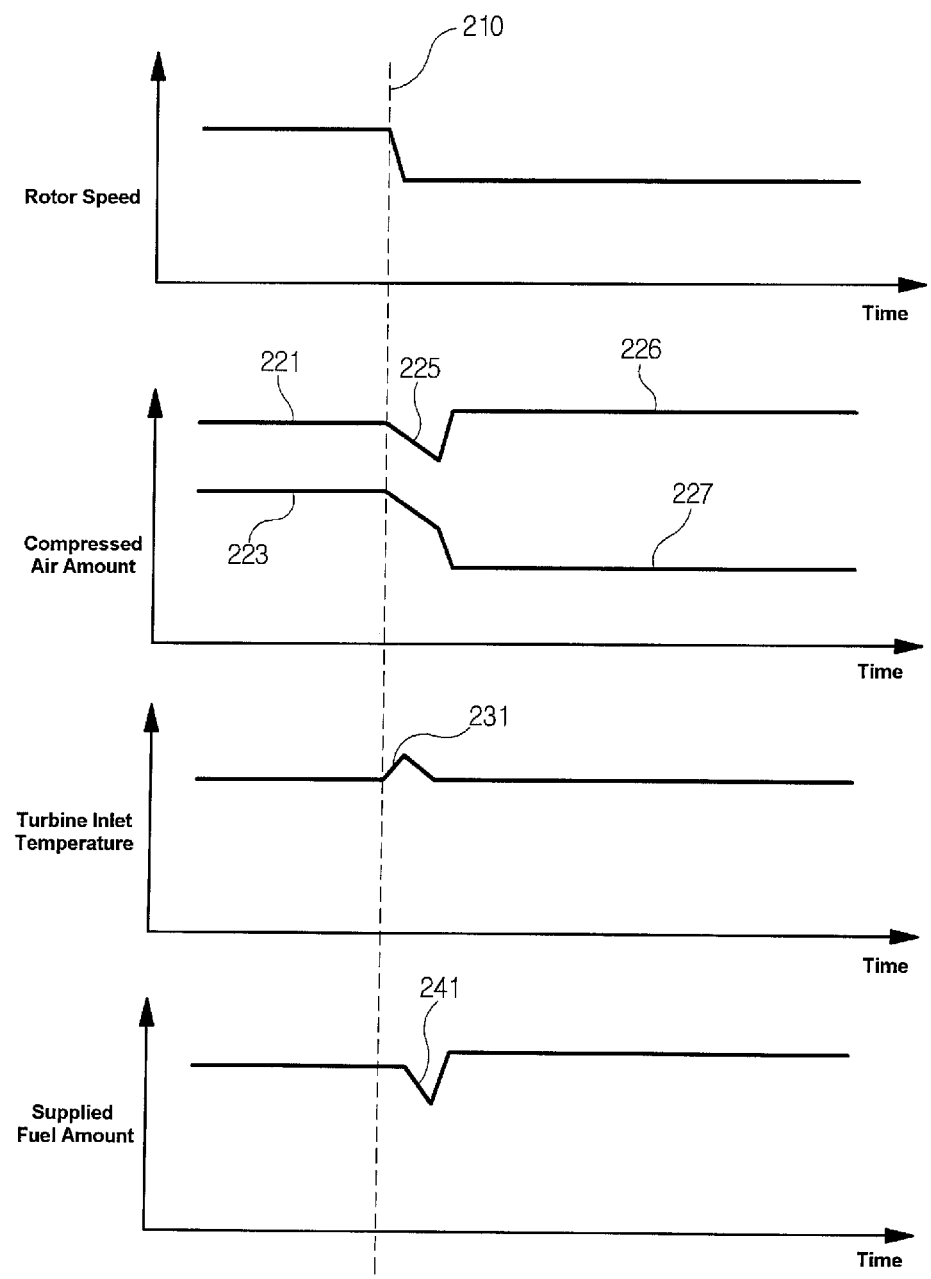

[FIG. 3]
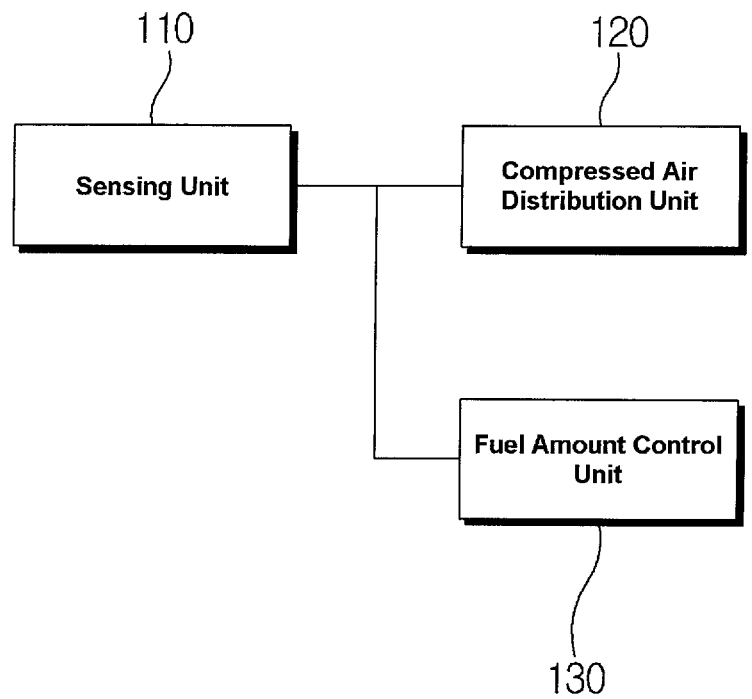

[FIG. 4]
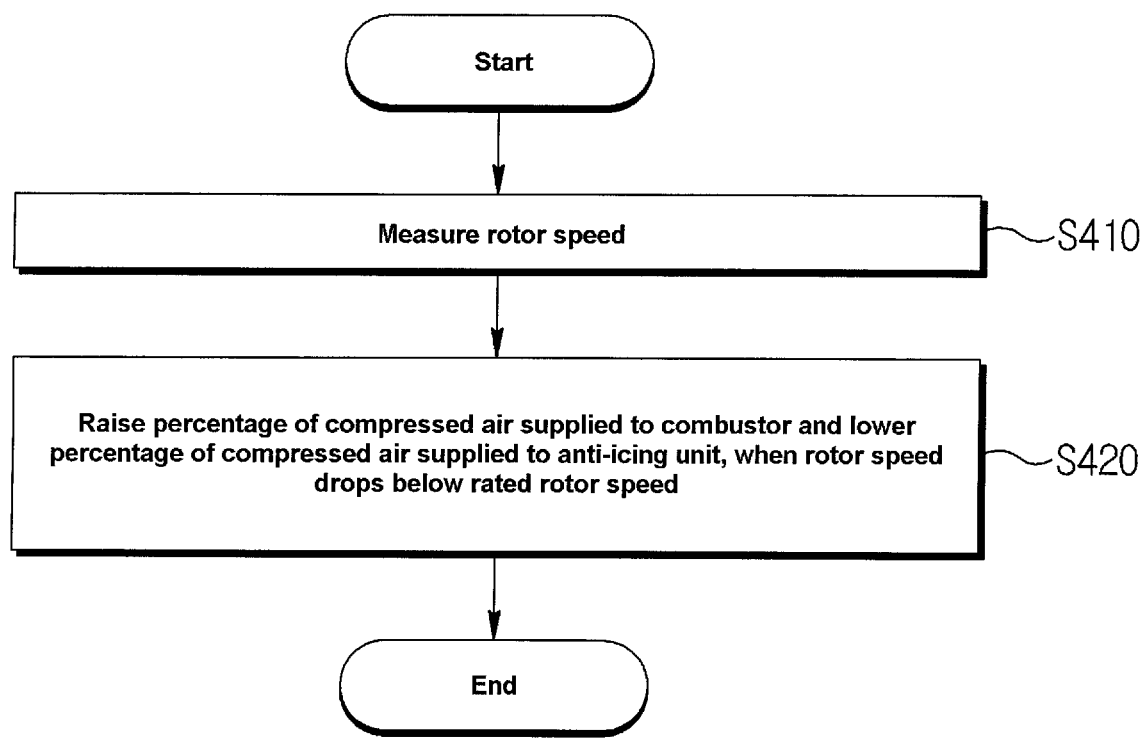

[FIG. 5]
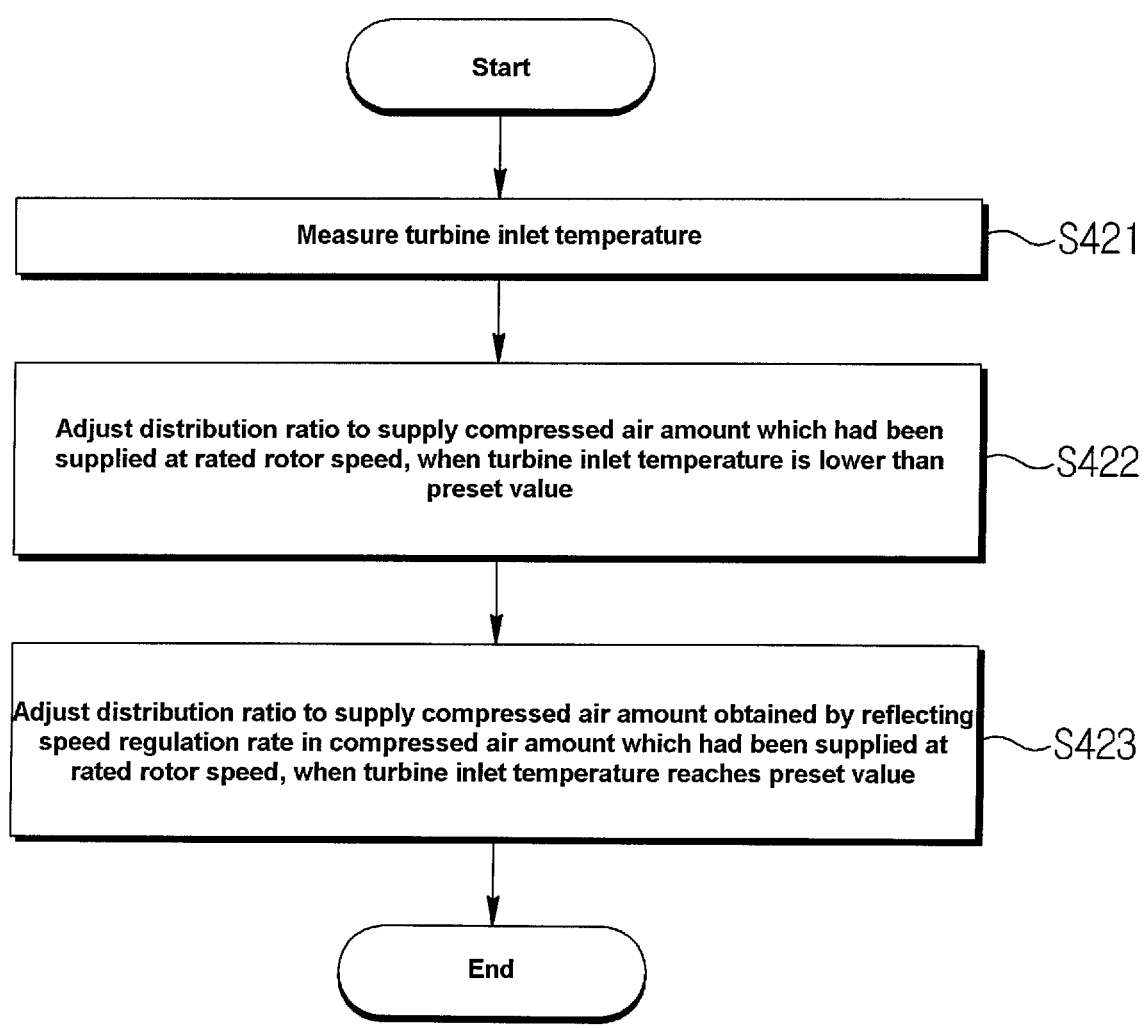

[FIG. 6]
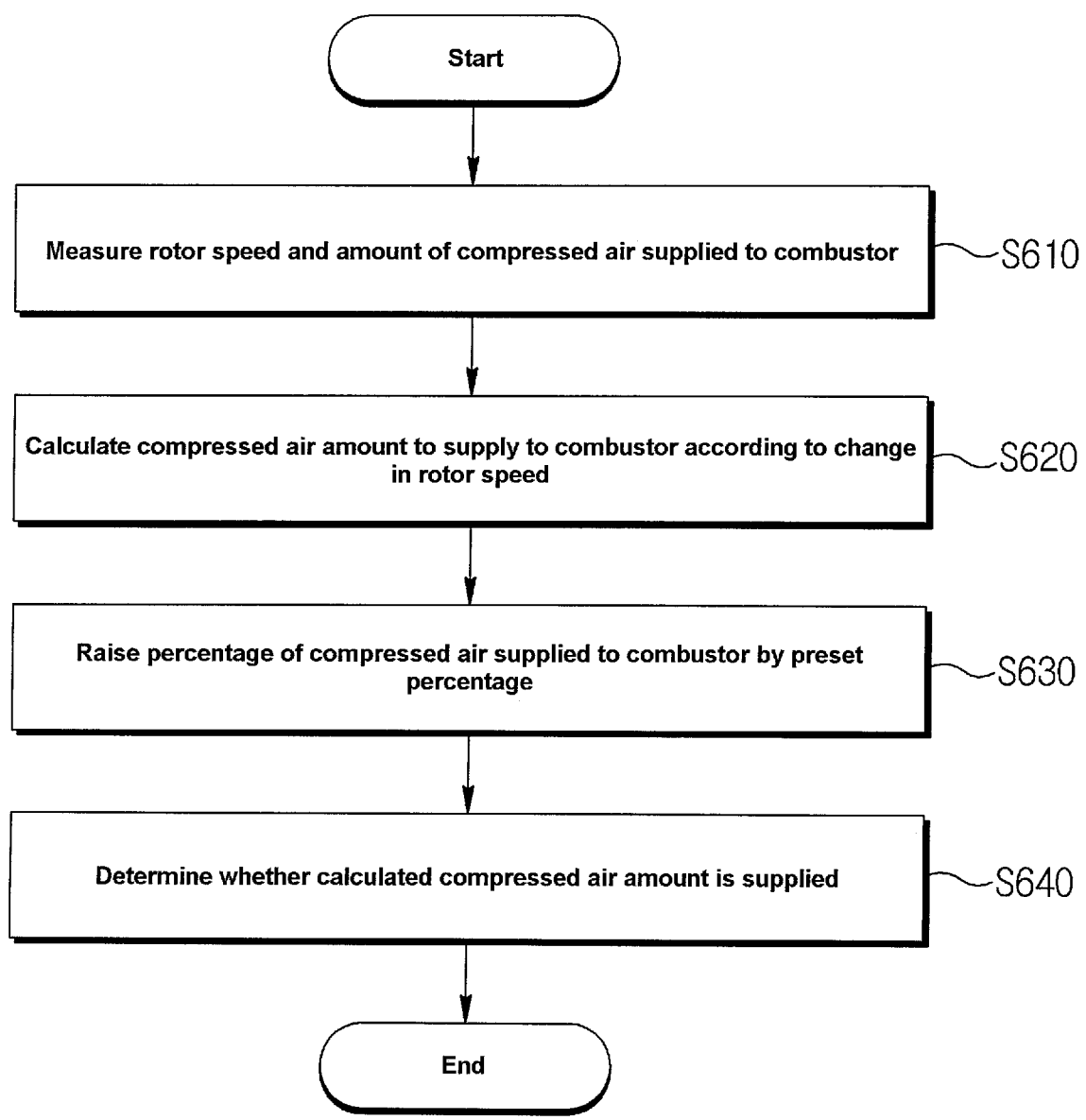

GAS TURBINE SYSTEM AND CONTROL APPARATUS AND METHOD THEREOF

CROSS-REFERENCE TO RELATED APPLICATIONS

This application claims priority to Korean Patent Application No. 10-2017-0052387, filed on Apr. 24, 2017, the disclosure of which is incorporated herein by reference in its entirety.

BACKGROUND OF THE INVENTION

Field of the Invention

Exemplary embodiments of the present invention relate to a gas turbine system and a control apparatus and method thereof, and more particularly, to a gas turbine system and a control apparatus and method thereof, which can control the amount of compressed air supplied to each of a combustor and an anti-icing unit in order to improve the droop control performance of the gas turbine system.

Description of the Related Art

In general, an engine or apparatus including a turbine such as a gas turbine or steam turbine refers to a power generation system for converting thermal energy of gas or fluid into a rotational force as mechanical energy, and includes a rotor axially rotated by gas or fluid and a stator supporting and surrounding the rotor.

A gas turbine which is used in a power station or the like in order to generate electricity may include a compressor, a combustor and a turbine. The compressor compresses air and supplies high-pressure air to the combustor, the combustor produces combustion gas, and the turbine is driven by the combustion gas discharged from the combustor.

In general, the compressor of the gas turbine is coupled to a shaft of the turbine, and axially rotated with the turbine. While being axially rotated, the compressor sucks air from the outside and compresses the sucked air. The compressed air is supplied to the combustor, and the combustor supplies fuel to the compressed air, produces high-temperature high-pressure combustion gas by combusting the fuel-air mixture, and supplies the high-temperature high-pressure combustion gas to the turbine.

The high-temperature high-pressure combustion gas supplied to the turbine drives rotor blades of the turbine, thereby rotating the rotor of the turbine.

In general, since the rotation of the turbine rotor is associated with the frequency of the system, the rotor speed is changed according to a change of the system frequency. When the system frequency significantly drops in such a system, the rotor speed is decreased, and the amount of compressed air produced by the compressor connected to the same shaft is also reduced.

However, when the system frequency is decreased, the gas turbine system should increase power generation by injecting a larger amount of fuel, in order to recover the system frequency. However, since the amount of compressed air produced by the compressor is reduced, the amount of compressed air introduced into the combustor is also inevitably reduced. As a result, the gas turbine system may not be able to supply a larger amount of fuel for increasing power generation, due to the limit of a turbine inlet temperature.

SUMMARY OF THE INVENTION

The present invention has been made in view of the above problems, and it is an object of the present invention to provide a gas turbine system and a control apparatus and method thereof, which can increase the amount of compressed air supplied to a combustor even though a system frequency is significantly lowered, in order to improve the droop control performance.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with one aspect of the present invention, there is provided a control apparatus of a gas turbine system which may include a compressor to compress air; an air suction unit to suction external air and deliver the suctioned air to the compressor to be compressed; an anti-icing unit to prevent moisture contained in the suctioned air from freezing in the air suction unit; a combustor to produce high-temperature, high-pressure combustion gas by combusting the compressed air and fuel; a supply to supply the compressed air from the compressor to the combustor and the anti-icing unit; a turbine including a rotor rotated by the combustion gas produced by the combustor; and a power generator driven by the rotation of the rotor, wherein the compressor and the turbine are coaxially connected to each other and the rotational speed of the rotor is proportional to a system frequency. The control apparatus may include a sensing unit configured to measure a rotor speed of the turbine, expressed in revolutions per minute (RPM); and a compressed air distribution unit configured to adjust a distribution ratio of the compressed air supplied to the combustor to the compressed air supplied to the anti-icing unit, based on the measured rotor speed.

When the measured rotor speed drops below a rated rotor speed, the distribution ratio may be adjusted by raising a percentage of the compressed air supplied to the combustor and lowering a percentage of the compressed air supplied to the anti-icing unit. The rated rotor speed may be the rotor speed occurring when the system frequency is equal to a rated frequency.

The sensing unit may be further configured to measure a turbine inlet temperature indicating a temperature of the combustion gas introduced to the turbine. When the measured turbine inlet temperature is lower than a preset value, the distribution ratio may be adjusted by supplying a first amount of compressed air to the combustor, the first amount corresponding to an amount supplied in a state where the rotor speed is equal to a rated rotor speed. When the turbine inlet temperature reaches the preset value, the distribution ratio may be adjusted by supplying a second amount of compressed air to the combustor, the second amount being obtained by reflecting a speed regulation rate in the first amount of compressed air.

The sensing unit may be further configured to measure a turbine inlet temperature indicating a temperature of the combustion gas introduced to the turbine. The compressed air distribution unit may be further configured to adjust the distribution ratio when the turbine inlet temperature is lower than the preset value, such that an adjusted percentage A1 of the compressed air supplied to the combustor and an adjusted percentage B1 of the compressed air supplied to the anti-icing unit become $$A1 = A\frac{N_N}{N_C} \text{ and } B1 = B - A\left(\frac{N_N}{N_C} - 1\right)$$

respectively, where $N_N$ denotes the rated rotor speed, $N_C$ denotes a current rotor speed, and A and B denote current percentages of the compressed air supplied to the combustor and the anti-icing unit, respectively, when the rotor speed is equal to the rated rotor speed. Here, the first amount of compressed air may be supplied to the combustor.

The sensing unit may be further configured to measure a turbine inlet temperature indicating a temperature of the combustion gas introduced to the turbine. The compressed air distribution unit may be further configured to adjust the distribution ratio when the turbine inlet temperature reaches the preset value, such that an adjusted percentage A1 of the compressed air supplied to the combustor and an adjusted percentage B1 of the compressed air supplied to the anti-icing unit become $$A1 = A\frac{N_N}{N_C}(1+\delta) \text{ and } B1 = B - A\left(\frac{N_N}{N_C}(1+\delta) - 1\right)$$

respectively, where $N_N$ denotes the rated rotor speed, $N_C$ denotes a current rotor speed, $\delta$ denotes a preset speed regulation rate, and A and B denote current percentages of the compressed air supplied to the combustor and the anti-icing unit, respectively, when the rotor speed is equal to the rated rotor speed.

The sensing unit may be further configured to measure a turbine inlet temperature indicating a temperature of the combustion gas introduced to the turbine. The compressed air distribution unit may be further configured to adjust the distribution ratio when the turbine inlet temperature reaches the preset value, such that an adjusted percentage A1 of the compressed air supplied to the combustor and an adjusted percentage B1 of the compressed air supplied to the anti-icing unit become $$A1 = A\frac{N_N}{N_C}\left(1 + \frac{P_2 - P_1}{P_1}\right) \text{ and } B1 = B - A\left[\frac{N_N}{N_C}\left(1 + \frac{P_2 - P_1}{P_1}\right) - 1\right]$$

respectively, where $N_N$ denotes the rated rotor speed, $N_C$ denotes a current rotor speed, $P_1$ denotes power of the power generator at the rated frequency, $P_2$ denotes power that the power generator needs to generate in order to adjust a speed regulation rate when the rotor speed changes from $N_N$ to $N_C$, and A and B denote current percentages of the compressed air supplied to the combustor and the anti-icing unit, respectively, when the rotor speed is equal to the rated rotor speed.

The control apparatus may further include a fuel amount control unit configured to control an amount of fuel supplied to the combustor, by changing the amount of fuel supplied to the combustor by a percentage equal to a percentage change in the amount of compressed air supplied to the combustor with respect to the adjusted distribution ratio.

In accordance with another aspect of the present invention, a gas turbine system for power generation may include a compressor configured to compress air; an air suction unit configured to suction external air and deliver the suctioned air to the compressor to be compressed; an anti-icing unit configured to prevent moisture contained in the suctioned air from freezing in the air suction unit; a combustor configured to produce high-temperature, high-pressure combustion gas by combusting the compressed air and fuel; a supply configured to supply the compressed air from the compressor to the combustor and the anti-icing unit; a turbine including a rotor rotated by the combustion gas produced by the combustor; a power generator driven by the rotation of the rotor; and the above control apparatus, configured to adjust the distribution ratio of the compressed air supplied to the combustor to the compressed air supplied to the anti-icing unit.

In accordance with still another aspect of the present invention, there is provided a control method of a gas turbine system configured as above may include measuring a rotor speed of the turbine, expressed in revolutions per minute (RPM); and adjusting a distribution ratio of the compressed air supplied to the combustor to the compressed air supplied to the anti-icing unit, based on the measured rotor speed.

The control method may further include steps of measuring a turbine inlet temperature indicating a temperature of the combustion gas introduced to the turbine, wherein, when the measured turbine inlet temperature is lower than a preset value, the distribution ratio is adjusted by supplying a first amount of compressed air to the combustor, the first amount corresponding to an amount supplied in a state where the rotor speed is equal to a rated rotor speed, and wherein, when the turbine inlet temperature reaches the preset value, the distribution ratio is adjusted by supplying a second amount of compressed air to the combustor, the second amount being obtained by reflecting a speed regulation rate in the first amount of compressed air.

The control method may further include a step of measuring a turbine inlet temperature indicating a temperature of the combustion gas introduced to the turbine. Here, the adjusting step may include an adjustment of the distribution ratio in cases when the turbine inlet temperature is lower than the preset value, or when the turbine inlet temperature reaches the preset value, in accordance with the above equations.

It is to be understood that both the foregoing general description and the following detailed description of the present invention are exemplary and explanatory and are intended to provide further explanation of the invention as claimed.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a diagram illustrating a gas turbine system according to an embodiment of the present invention;

FIG. 2 is a set of graphs for describing an operation of the control apparatus of FIG. 1 according to an exemplary embodiment of the present invention;

FIG. 3 is a block diagram illustrating the structure of the control apparatus of FIG. 1 according to an exemplary embodiment of the present invention;

FIG. 4 is a flowchart illustrating a compressed air distribution method of the control apparatus according to an embodiment of the present invention;

FIG. 5 is a flowchart illustrating a method for adjusting a compressed air distribution ratio in the control apparatus according to an embodiment of the present invention; and FIG. 6 is a flowchart illustrating another method for adjusting a compressed air distribution ratio in the control apparatus according to an embodiment of the present invention.

DESCRIPTION OF SPECIFIC EMBODIMENTS

In order to clearly describe the present invention, elements irrelevant to the descriptions will be omitted. Throughout the specification, the same or like components are represented by the same reference numerals.

In this specification, when an element is referred to as being "connected" to another element, it may not only indicate that the former element is "directly connected" to the latter element, but also indicate that the former element is "electrically connected" to the latter element with another element interposed therebetween. Moreover, when an element is referred to as "including" a component, it may indicate that the element does not exclude another component but can further include another component, unless referred to the contrary.

When an element is referred to as being disposed "over" another element, it may indicate that the former element is disposed immediately over the latter element or another element is interposed therebetween. However, when an element is referred to as being disposed "immediately over" another element, it may indicate that no elements are interposed therebetween.

The terms such as first, second and third are used to describe various parts, components, regions, layers and/or sections, but are not limited thereto. Those terms are only used to distinguish a part, component, region, layer or section from another part, component, region, layer or section. Therefore, a first part, component, region, layer or section in the following descriptions may be referred to as a second part, component, region, layer or section without departing the scope of the present invention.

The technical terms used in this specification are only used to describe a specific embodiment, but not intended to limit the present invention. The terms of a singular form used herein may include plural forms unless referred to the contrary. The meaning of the term "including" used in this specification specifies a characteristic, region, integer, step, operation, element and/or component, and does not exclude the presence or addition of another characteristic, region, integer, step, operation, element and/or component.

The terms such as "under" and "above", indicating spatial relations, may be used to more easily describe the relation between one part and another part in the drawings. Such terms are intended to include not only meanings intended in the drawings, but also other meanings or operations of an apparatus in use. For example, when an apparatus in a drawing is turned over, certain parts which have been described as being disposed "under" other parts may be described as being disposed "over" the other parts. Therefore, the exemplary term "under" may include both directions of over and under. The apparatus may be rotated at an angle of 90° or another angle, and the terms indicating spatial relations may be analyzed according to the rotation.

Although not defined differently, all terms including the technical terms and scientific terms used herein have the same meanings as those understood by a person skilled in the art to which the present invention pertains. The terms defined in a generally used dictionary may be additionally analyzed as meanings which coincide with the related technical documents and the contents disclosed in this specification, and not analyzed as ideal or formal meanings unless they are not defined.

Hereafter, exemplary embodiments of the present invention will be described with reference to the accompanying drawings, such that the present invention can be easily carried out by those skilled in the art to which the present invention pertains. However, the present invention can be embodied in various manners, and is not be limited to the embodiments described herein.

FIG. 1 illustrates a gas turbine system according to an embodiment of the present invention.

Referring to FIG. 1, the gas turbine system may include a compressor 10, a turbine 20, a combustor 30, a shaft 40, a supply 50, an air suction unit 60, an anti-icing unit 70, a power generator 80, and a control apparatus 100.

The air suction unit 60 performs a function of suctioning air from outside and delivering the suctioned air to the compressor 10. An air filter (not shown) or the like is installed in the air suction unit 60, in order to prevent compressor blades from being contaminated by dust contained in the external air while suppressing an output reduction. Moisture is contained in the air suctioned by the air suction unit 60, and the anti-icing unit 70 provides an anti-icing function for preventing the moisture from freezing in the filter of the air suction unit 60. The anti-icing unit 70 may be integrated with the air suction unit 60.

The compressor 10 may perform a function of producing high-pressure compressed air by compressing the air introduced through the air suction unit 60. The compressed air may be delivered to the combustor 30 through the supply 50, and a part of the compressed air may be delivered to the anti-icing unit 70 to prevent moisture from freezing, the moisture being contained in the air introduced through the air suction unit 60.

The combustor 30 may inject fuel into the compressed air delivered from the compressor 10 and combust the air-fuel mixture. In doing so, the combustor 30 may produce high-pressure, high-temperature combustion gas which is provided to the turbine 20. The high-pressure, high-temperature combustion gas supplied by the combustor 30 to the turbine 20 drives rotor blades (not shown) of the turbine 20, thereby rotating a rotor (not shown) of the turbine 20. The temperature and pressure of the high-pressure high-temperature combustion gas supplied to the turbine 20 are lowered while the combustion gas drives the rotor blades of the turbine. Finally, the combustion gas is discharged as exhaust gas to the atmosphere.

The power generator 80 may generate power using the rotation of the rotor of the turbine 20.

The turbine 20 and the compressor 10 may each be fixed to the (one) shaft 40. Therefore, with the rotor of the turbine 20 rotated as described above, the compressor 10 may also be rotated to compress air.

In general, the control apparatus 100 may perform various control operations in order to efficiently drive the gas turbine system. In the embodiment of the present invention, the control apparatus 100 may control the supply 50 to adjust an amount of compressed air supplied to each of the anti-icing unit 70 and the combustor 30, and additionally control the amount of fuel supplied to the combustor 30. The supply 50 is briefly described in this specification, but may include a valve for adjusting the opening degree of a compressed air pipe connected to each of the combustor 30 and the anti-icing unit 70, and the control apparatus 100 may control the valve to adjust the amount of compressed air supplied to each of the anti-icing unit 70 and the combustor 30.

In the gas turbine system, a method for adjusting the rotor speed of the turbine 20 may be divided into a load limit control method and a governor free control method. The load limit control method refers to a method that fixes the rotor speed of the turbine 20, and the governor free control method refers to a method that automatically controls the rotor speed of the turbine 20 according to a frequency change of a power system. In general, a system frequency for stable operation of the entire power system needs to be retained at the rated frequency (60 Hz in the case of Korea). Therefore, operators of the gas turbine system prefer the load limit control method which can prevent a sudden fluctuation of the gas turbine system, in terms of facility protection. However, the "power market operation rule" applicable to power generation companies, as set by the Korea Power Exchange that supervises stable operations of the country's entire power system, obliges member companies to "actively cooperate to retain the system frequency through governor free operation." Thus, the gas turbine system is generally operated according to the governor free control method.

When the gas turbine system is operated according to the governor free control method, the rotor of the turbine 20 is rotated at a rotation speed proportional to the system frequency. At this time, the concept of speed regulation (or droop control) rate may be introduced. The speed regulation rate refers to a percentage ratio of a frequency change rate (a change rate of the rotor rotation speed of the turbine 20) to a change rate of the power of the power generator 80. For example, assuming that power plants A through K supply power to the power system, when power plant K stops supplying power due to a breakdown or similar event, the amount of the power generation may fall short. Then, the system frequency may be lowered by an imbalance between the amount of the power generation and a load. In this case, the power plants A through J need to properly share the shortage of the power generation, and additionally generate power to rapidly recover the system frequency. At this time, each of the plants tries to additionally generate power according to the given speed regulation rate.

In general, the speed regulation rate δ is expressed as Equation 1 below.

$$\delta = \frac{\left(\frac{N_1 - N_C}{N_N}\right)}{\left(\frac{P_{21} - P_1}{P_N}\right)} \times 100 \quad \text{[Equation 1]}$$

From Equation 1, Equation 2 may be acquired.

$$P_{21} = P_1 + \frac{P_N}{\delta} \frac{N_1 - N_C}{N_N} \times 100 \quad \text{[Equation 2]}$$

In Equation 2, $N_1$, $N_C$ and $N_N$ are rotor speed values (expressed in revolutions per minute, or RPM) of the turbine 20, and $P_1$, $P_{21}$ and $P_N$ are power values of the power generator 80. More specifically, $N_1$ denotes the previous rotor speed, $N_C$ denotes the current rotor speed, $N_N$ denotes the rated rotor speed, $P_1$ denotes the previous power of the power generator 80, $P_{21}$ denotes a power that the power generator should generate when the rotor speed changes from $N_1$ to $N_C$, and $P_N$ denotes the rated power.

For example, the system frequency may undergo a sudden drop from the rated frequency due to an event occurring in the system, and arbitrary values associated with the event may be a speed regulation rate δ of 3%, a rated power $P_N$ of 28.8 MW, a previous power $P_1$ of 21.6 MW, and a system frequency drop to 59.7 Hz from a rated frequency of 60 Hz. Further, since the rotor speed is proportional to the system frequency, $N_1$ and $N_N$ may each be assumed as 60 k ($N_1=N_N=60$ k) and $N_C$ as 59.7 k ($N_C=59.7$ k). Then, the power generator 80 should generate power $P_{21}$ of 26.4 MW in order to restore the system frequency to the rated frequency.

That is, when the system frequency drops due to a system event, the control apparatus 100 needs to control the gas turbine system of FIG. 1 to adjust the speed regulation rate in order to produce a larger amount of combustion gas produced by the combustor 30. This is achieved by increasing an amount of fuel supplied to the combustor 30 and thereby raising the power of the power generator 80.

In general, however, the gas turbine system is operated while a turbine inlet temperature is, under restrictions, maintained at almost the maximum temperature, in order to raise efficiency. Therefore, when a larger amount of fuel is supplied to the combustor 30 to raise the power of the power generator 80, the turbine inlet temperature may rise further and exceed the limit, thereby causing an adverse influence on the gas turbine system. When the amount of compressed air supplied to the combustor 30 is increased in order to prevent such a problem, a larger amount of fuel can be supplied while the turbine inlet temperature is maintained at almost the maximum temperature. The turbine inlet may indicate a portion through which the combustion gas produced through the combustor 30 is introduced into the turbine 20.

When the compressor 10 and the rotor of the turbine 20 are connected to each other through the same shaft 40, if the system frequency is lowered, the revolution number of the shaft is decreased in proportion to the system frequency. Therefore, the amount of compressed air produced through the compressor 10 is also reduced. That is, the combustor 30 requires a larger amount of compressed air, but an actual amount of compressed air produced by the compressor 10 may be reduced in proportion to the system frequency.

In order to solve such a problem, the control apparatus 100 of the gas turbine system according to the embodiment of the present invention may control the supply 50 to reduce the amount of compressed air supplied to the anti-icing unit 70 and to increase the amount of compressed air supplied to the combustor 30. Therefore, the control apparatus 100 can increase the total amount of compressed air supplied to the combustor 30, compared to in the related art.

That is, when the revolution number of the rotor of the turbine 20 is decreased by the drop of the system frequency, the control apparatus 100 may control the supply 50 to reduce the amount of compressed air supplied to the anti-icing unit 70 and to increase the amount of compressed air supplied to the combustor 30.

FIG. 2 is for describing the operation of the control apparatus 100 according to the embodiment of the present invention. In each graph, system parameters are shown over time, relative to a system frequency drop event occurring at a point 210.

FIG. 2 shows that, when the system frequency drops at the point 210, the rotor speed of the turbine 20, which has been rotated at the rated frequency, reacts by decreasing in proportion to the system frequency. With the decrease in rotor speed, the amount of compressed air which can be produced by the compressor 10 connected to the same shaft as the rotor is inevitably reduced. Therefore, the amount of compressed air supplied to each of the combustor 30 and the anti-icing unit 70 is also reduced. When the rotor speed of the turbine 20 is adjusted to the rated system frequency, the control apparatus 100 may control the supply 50 to supply a percentage A (221) of the amount of compressed air produced through the compressor 10 to the combustor 30 and to supply a percentage B (223) of the amount of compressed air produced through the compressor 10 to the anti-icing unit 70. Here, the percentage A and the percentage B are values referenced in Equation 3 below. When the control apparatus 100 maintains the percentage ratio, the amount of compressed air supplied to the combustor 30 is reduced in proportion to the amount of compressed air produced through the compressor 10.

When the compressed air amount supplied to the combustor 30 is reduced (225) by a variation in rotor speed of the turbine 20 while the fuel amount supplied to the combustor 30 is maintained, the turbine inlet temperature rises (231). That is, since the control apparatus 100 supplies fuel to the combustor 30 such that the gas turbine system is operated at a turbine inlet temperature close to the allowable maximum turbine inlet temperature to acquire the maximum efficiency, the turbine inlet temperature rises if the compressed air amount supplied to the combustor 30 is reduced. In order to prevent the rise of the turbine inlet temperature, the control apparatus 100 inevitably reduces the amount of fuel supplied to the combustor 30 (241). However, when the amount of fuel supplied to the combustor 30 is reduced, the power of the power generator is reduced. Therefore, a desired speed regulation rate cannot be acquired.

In order to prevent such a problem, the control apparatus 100 according to the embodiment of the present invention changes the percentage of the compressed air amount supplied to the combustor 30 and the percentage of the compressed air amount supplied to the anti-icing unit 70, with respect to the amount of compressed air produced by the compressor 10. That is, referring back to the second graph of FIG. 2, the control apparatus 100 raises the percentage of the compressed air amount supplied to the combustor 30 from A % to A1% (226) and lowers the percentage of the compressed air amount supplied to the anti-icing unit 70 from B % to B1% (227).

At this time, the control apparatus 100 may set the raised and lowered percentages such that the compressed air amount supplied to the combustor 30 is larger than the compressed air amount which had been supplied when the rotor of the turbine 20 was rotated at the rated system frequency. Alternatively, the control apparatus 100 may change the percentage ratio while continuously measuring the compressed air amount supplied to the combustor 30 using a sensor.

As described above, when the control apparatus 100 increases the percentage of the compressed air amount supplied to the combustor 30, the turbine inlet temperature may be lowered, thereby allowing the control apparatus 100 to increase the fuel amount supplied to the combustor 30. At this time, when the fuel amount supplied to the combustor 30 becomes larger than the fuel amount supplied at the rated system frequency, the control apparatus 100 can control the power generator to raise the power according to the speed regulation rate, thereby improving the droop control performance.

FIG. 3 illustrates the structure of the control apparatus 100 according to the embodiment of the present invention.

Referring to FIG. 3, the control apparatus 100 according to the embodiment of the present invention may include a sensing unit 110, a compressed air distribution unit 120, and a fuel amount control unit 130.

The sensing unit 110 may measure the rotor speed of the turbine 20 and the turbine inlet temperature. In addition, the sensing unit 110 may measure the amount of compressed air supplied to the combustor 30.

The compressed air distribution unit 120 may control the compressed air amount supplied to each of the combustor 30 and the anti-icing unit 70, based on the revolution number of the rotor of the turbine 20 and the turbine inlet temperature which are measured by the sensing unit 110.

As described above, when the rotor is rotated at a speed (the rated rotor speed) corresponding to the rated system frequency, the compressed air distribution unit 120 may supply the percentage A of the compressed air produced through the compressor 10 to the combustor 30, and supply the percentage B of the produced compressed air to the anti-icing unit 70. At this time, the sum of the percentage A and the percentage B is not necessarily equal to 100 percent. This is because, when the compressed air is needed by another component of the gas turbine system, that is, a component other than the combustor 30 and the anti-icing unit 70, the compressed air distribution unit 120 may distribute part of the compressed air produced through the compressor 10 to the corresponding component.

If the rotor speed of the turbine 20 drops below the rotor speed corresponding to the rated system frequency, the total amount of compressed air produced by the compressor 10 is reduced. Thus, the amount of compressed air supplied to the combustor 30 is also reduced. In order to recover the amount of compressed air supplied to the combustor 30, the compressed air distribution unit 120 may raise the percentage of the compressed air supplied to the combustor 30 and lower the percentage of the compressed air supplied to the anti-icing unit 70, with respect to the total amount of compressed air produced through the compressor 10. At this time, when the turbine inlet temperature is lower than a preset maximum turbine inlet temperature, the compressed air distribution unit 120 may increase the compressed air amount to the compressed air amount which had been supplied when the rotor speed of the turbine 20 was the rated revolution number. Furthermore, when the turbine inlet temperature reaches the preset maximum turbine inlet temperature, the compressed air distribution unit 120 may increase the compressed air amount to the compressed air amount which had been supplied when the rotor speed corresponded to the rated system frequency.

In an embodiment, it may be assumed that, when the amount of compressed air produced by the compressor 10 is set to 100 and the rotor of the turbine 20 is rotated at the rotor speed corresponding to the rated system frequency, 70% of the compressed air amount is supplied to the combustor 30, and 20% of the compressed air amount is supplied to the anti-icing unit 70. It may further be assumed that the system frequency was lowered by 3% to 58.2 Hz from the rated frequency of 60 Hz, because the amount of supplied power was reduced due to an event at another power plant. In this case, the rotor speed of the turbine 20 is also decreased by 3% because the rotor speed of the turbine 20 is proportional to the system frequency. Therefore, the total amount of compressed air produced through the compressor 10 will be reduced by 3%. This assumption considers that the compressed air is produced in linear proportion to the rotor speed of the turbine 20. However, an amount of compressed air produced for each rotor speed may be measured and used. Then, the total amount of compressed air produced through the compressor 10 becomes 97 (=100×

0.97). When only 70% of the compressed air amount is supplied to the combustor 30, the compressed air amount corresponding to 67.9 may be supplied to the combustor 30. That is, the amount of compressed air supplied to the combustor 30 is also reduced by 3% to 67.9 from 70.

In order to recover the amount of compressed air supplied to the combustor 30, the compressed air distribution unit 120 may raise the percentage allocated to the combustor 30. At this time, the compressed air distribution unit 120 may adjust the raised percentage based on the turbine inlet temperature. When the turbine inlet temperature is lower than the preset maximum value, the compressed air distribution unit 120 may adjust the percentage to increase the amount of compressed air to the compressed air amount which had been supplied when the revolution number of the rotor of the turbine 20 was the rated revolution number. That is, the compressed air distribution unit 120 may adjust the percentage to 70. Then, the compressed air distribution unit 120 may raise the percentage of the compressed air supplied to the combustor 30 to 72.165% (=70/97×100). On the other hand, the compressed air distribution unit 120 may lower the percentage of the compressed air supplied to the anti-icing unit 70 to 17.835%. That is, the compressed air distribution unit 120 may supply the compressed air amount corresponding to 17.3 to the anti-icing unit 70.

The above-described contents may be expressed as Equation 3 below which is a more generalized equation.

$$A1 = A\frac{N_N}{N_C}, B1 = B - A\left(\frac{N_N}{N_C} - 1\right)$$ [Equation 3]

In Equation 3, $N_N$ denotes the rated rotor speed of the turbine 20, $N_C$ denotes the current rotor speed of the turbine 20, A denotes the percentage of the compressed air amount supplied to the combustor 30 when the rotor speed of the turbine 20 is the rated rotor speed, and B denotes the percentage of the compressed air amount supplied to the anti-icing unit 70 when the rotor speed of the turbine 20 is the rated rotor speed, where A+B=A1+A2.

Furthermore, $\delta$ denotes the speed regulation rate, $P_1$ denotes power of the power generator 80 at the rated system frequency, and $P_2$ denotes power that the power generator 80 needs to generate at the current system frequency calculated through Equation 2. Based on Equation 3, the percentage of the compressed air amount supplied to the anti-icing unit 70 may also be calculated.

According to another control method when the turbine inlet temperature is lower than the preset maximum value, the supply ratio may be set as in the related art. In this case, although the amount of compressed air supplied to the combustor 30 is reduced, there is a margin for increasing the amount of fuel supplied to the combustor 30 because the turbine inlet temperature is lower than the preset maximum value. When the amount of fuel is increased, the power may be raised to adjust the speed regulation rate.

When the turbine inlet temperature is close to or corresponds to the preset maximum value, the compressed air distribution unit 120 may further increase the amount of fuel supplied to the combustor 30. In other words, the compressed air distribution unit 120 may further increase the supplied fuel amount when the turbine inlet temperature closely approaches the preset maximum value to be substantially equal to, or to exceed, the preset maximum value. In this case, the increased fuel amount may be proportional to the speed regulation rate. Alternatively, the increase of the fuel amount may be decided based on the power calculated through Equation 2. That is, a new (i.e., adjusted) percentage A1 of compressed air amount supplied to the combustor 30 with respect to the amount of the compressed air produced through the compressor 10 may be calculated through Equation 4 below.

$$A1 = A\frac{N_N}{N_C}(1 + \delta) \text{ or } A1 = A\frac{N_N}{N_C}\left(1 + \frac{P_2 - P_1}{P_1}\right)$$ [Equation 4]

In Equation 4, $N_N$ denotes the rotor speed of the turbine 20, corresponding to the rated system frequency, $N_C$ denotes the current rotor speed of the turbine 20, A denotes the percentage of the compressed air amount supplied to the combustor 30 when the rotor speed of the turbine 20 is $N_N$, $\delta$ denotes the speed regulation rate, $P_1$ denotes the power of the power generator 80 at the rated system frequency, and $P_2$ denotes the power which the power generator 80 needs to generate at the current system frequency calculated through Equation 2. Based on Equation 4, the compressed air distribution unit 120 may also calculate the percentage of the compressed air amount supplied to the anti-icing unit 70.

As in the above-described example, it is supposed that the system frequency was reduced by 3% to 58.2 Hz from the rated frequency of 60 Hz. Then, $N_N$ becomes 60 k, and $N_C$ becomes 58.2 k. When it is assumed that A is 70% and the speed regulation rate is 4% or 0.04, the new percentage A1 of the compressed air amount supplied to the combustor 30 is calculated as 75.05%. As a result, the amount of compressed air supplied to the combustor 30 is increased by 4% to 72.8 from 70. On the other hand, the percentage of the compressed air amount supplied to the anti-icing unit 70 is reduced to 14.95% from 20%. As a result, the amount of compressed air supplied to the anti-icing unit 70 is further reduced to 14.5 from 20.

Even when Equation 3 or 4 is based on the power of the power generator 80, the amount of compressed air can be calculated in the same manner.

That is, when the system frequency is lowered, the compressed air distribution unit 120 may lower the percentage of the compressed air amount supplied to the anti-icing unit 70, and raise the percentage of the compressed air amount supplied to the combustor 30, thereby improving the droop control performance.

The fuel amount control unit 130 may control the amount of fuel supplied to the combustor 30.

When the rotor of the turbine 20 is rotated at the speed corresponding to the rated system frequency, the fuel amount control unit 130 may supply an appropriate amount of fuel such that the turbine inlet temperature is close to the preset maximum value, in order to provide optimal efficiency. In addition, the fuel amount control unit 130 may control the amount of fuel supplied to the combustor 30, based on various parameters other than the turbine inlet temperature.

The fuel amount control unit 130 may control the amount of fuel supplied to the combustor 30 in order to adjust the speed regulation rate separately from the compressed air distribution unit 120 or in cooperation with the compressed air distribution unit 120. That is, when a decrease in rotor speed of the turbine 20, which is proportional to a drop of the system frequency, is recognized through the sensing unit 110, the fuel amount control unit 130 may determine whether to additionally supply fuel based on the turbine inlet temperature. That is, when the rotor speed of the turbine 20 is decreased, the fuel amount control unit 130 needs to supply a larger amount of fuel to raise the rotor speed of the turbine 20. However, when the turbine inlet temperature reaches the preset maximum value, the fuel amount control unit 130 cannot additionally supply fuel. In particular, when the amount of compressed air supplied to the combustor 30 is reduced by the decrease in the rotor speed of the turbine 20, the turbine inlet temperature may exceed the preset maximum value. In this case, the fuel amount control unit 130 needs to reduce the amount of fuel supplied to the combustor 30.

Therefore, the fuel amount control unit 130 may check that the percentage ratio has been changed by the compressed air distribution unit 120, i.e., an adjusted distribution ratio, such that a larger (or smaller) amount of compressed air is introduced into the combustor 30, and increase (or decrease) the amount of fuel supplied to the combustor 30 accordingly. Alternatively, since the turbine inlet temperature can be changed by the operation of the compressed air distribution unit 120, the fuel amount control unit 130 may control the amount of fuel supplied to the combustor 30 based on the rotor speed of the turbine 20 and information indicating whether the turbine inlet temperature is lower than or equal to the preset maximum value. On other words, the fuel amount control unit 130 is configured to control an amount of fuel supplied to the combustor 30, by changing (increasing or decreasing) the amount of fuel supplied to the combustor 30 by a percentage equal to a percentage change (up or down) in the amount of compressed air supplied to the combustor 30 with respect to the adjusted distribution ratio.

As such, the control apparatus 100 of the gas turbine system according to the embodiment of the present invention can increase power by supplying a larger amount of fuel when the system frequency is lowered, thereby improving the droop control performance for constantly maintaining the system frequency.

FIG. 4 illustrates a compressed air distribution method of the control apparatus 100 according to an embodiment of the present invention.

Referring to FIG. 4, the control apparatus 100 first measures the rotor speed in order to distribute compressed air produced through the compressor 10 to the combustor 30 and the anti-icing unit 70, at step S410. When the rotor speed is the rated rotor speed, the control apparatus 100 maintains the current distribution ratio. The current distribution ratio may be a value which is set in advance or determined in real time while being continuously changed in response to variables of the gas turbine system when the rotor is rotated at the rated rotor speed.

When the rotor speed of the turbine 20 drops below the rated rotor speed, the control apparatus 100 may change the distribution ratio in order to raise the percentage of the compressed air amount supplied to the combustor 30 while lowering the percentage of the compressed air amount supplied to the anti-icing unit 70, at step S420. That is, when the rotor speed of the turbine 20 is lowered below the rated rotor speed, the amount of compressed air produced through the compressor 10 is also reduced. Therefore, the amount of compressed air supplied to the combustor 30 may be changed. In order to recover the change of the compressed air amount, the control apparatus 100 may raise the distribution percentage of the compressed air amount supplied to the combustor 30, and lower the distribution percentage of the compressed air amount supplied to the anti-icing unit 70.

FIG. 5 illustrates a method for adjusting the compressed air distribution ratio in the control apparatus 100 according to an embodiment of the present invention.

Referring to FIG. 5, the control apparatus 100 according to the embodiment of the present invention may measure the turbine inlet temperature in order to adjust the compressed air distribution ratio, at step S421. When the measured turbine inlet temperature is lower than the preset value, the control apparatus 100 may adjust the compressed air distribution ratio to supply the combustor 30 with the compressed air amount which had been supplied at the rated rotor speed, at step S422.

Here, the compressed air amount which had been supplied at the rated rotor speed can be expressed as a first amount of compressed air being supplied to the combustor 30, which corresponds to an amount supplied in a state where the rotor speed is equal to a rated rotor speed. Thus, at step S422, the distribution ratio is adjusted by supplying the first amount of compressed air to the combustor 30 when the measured turbine inlet temperature is lower than the preset value.

On the other hand, when the measured turbine inlet temperature reaches the preset value, or is at least substantially equal to the preset value, the control apparatus 100 may adjust the compressed air distribution ratio to increase the compressed air amount by reflecting the speed regulation rate in the compressed air amount which had been supplied at the rated rotor speed, at step S423. For example, as described through Equation 3 or 4, the control apparatus 100 may add a percentage corresponding to the speed regulation rate δ to the distribution percentage of the compressed air amount which had been supplied at the rated revolution number, or calculate power that the power generator needs to generate according to the speed regulation rate, and adjust the distribution ratio based on the calculated power. At step S423, the compressed air amount reflecting the speed regulation rate can be expressed as a second amount of compressed air being supplied to the combustor 30, which corresponds to an amount obtained by reflecting the speed regulation rate in the first amount of compressed air.

FIG. 6 illustrates another method for adjusting the compressed air distribution ratio in the control apparatus 100 according to an embodiment of the present invention.

Referring to FIG. 6, the control apparatus 100 measures the rotor speed and the amount of compressed air supplied to the combustor at step S610, and calculates an amount of compressed air which needs to be supplied to the combustor according to a change in rotor speed, at step S620. At this time, the control apparatus 100 may calculate the compressed air amount through Equation 3 or 4, and calculate the compressed air amount by applying variables of the entire gas turbine system. Alternatively, the control apparatus 100 may use data which have been acquired while the gas turbine system was operated. More specifically, the control apparatus 100 may calculate power that the power generator needs to generate, according to Equation 2. At this time, the control apparatus 100 can estimate or calculate an amount of compressed air required for generate the calculated power, based on the data.

The control apparatus 100 increases the percentage of the compressed air amount supplied to the combustor 30 by a preset percentage or a percentage decided through a preset method, such that the calculated amount of compressed air is supplied to the combustor 30, at step S630. Then, the control apparatus 100 measures the compressed air amount supplied to the combustor and determines whether the calculated amount of compressed air is supplied, at step S640. When the compressed air amount supplied to the combustor is smaller than the calculated amount of compressed air, the control apparatus 100 further increases the percentage of the compressed air amount supplied to the combustor 30 through step S630, and again determines whether the calculated amount of compressed air is supplied. That is, until the compressed air amount calculated at step S620 is supplied to the combustor 30, the control apparatus 100 may repeat steps S630 and S640.

The present invention discloses the control apparatus which controls the amount of compressed air supplied to each of the combustor 30 and the anti-icing unit 70 when the current rotor speed (expressed in RPM) of the turbine 20 is lower than the rated rotor speed (expressed in RPM). Use of the control apparatus can improve the droop control performance in gas turbine systems.

According to the embodiments of the present invention, the control apparatus and method can increase the amount of compressed air supplied to the combustor even though the revolution number of the turbine connected with the system frequency is significantly lowered.

Furthermore, according to the embodiments of the present invention, the control apparatus and method can improve the situation in which the droop control performance cannot be satisfied by the amount of compressed air supplied to the combustor and the limit of the turbine inlet temperature, there adjusting a speed regulation rate required by a company.

While the present invention has been described with respect to the specific embodiments, it will be apparent to those skilled in the art that various changes and modifications may be made without departing from the spirit and scope of the invention as defined in the following claims.

What is claimed is:

1. A control apparatus of a gas turbine system which includes a compressor to compress air; an air inlet to draw external air and deliver the drawn air to the compressor to be compressed; an anti-icer to prevent moisture contained in the drawn air from freezing in the air inlet; a combustor to produce high-temperature, high-pressure combustion gas by combusting the compressed air and fuel; a supply configured to adjustably supply a first percentage of the compressed air from the compressor to the combustor and a second percentage of the compressed air from the compressor to the anti-icer and thereby set a distribution ratio defined as a ratio of the first percentage to the second percentage; a turbine including a rotor that is rotated at a rotor speed proportional to a system frequency by the combustion gas produced by the combustor and introduced to the turbine; and a power generator driven by the rotation of the rotor, wherein the compressor and the turbine are coaxially connected to each other, the control apparatus comprising:

a plurality of sensors installed in the gas turbine system, the plurality of sensors including
   a rotor speed sensor configured to measure the rotor speed, expressed in revolutions per minute (RPM); and
   a temperature sensor configured to measure a turbine inlet temperature indicating a temperature of the combustion gas introduced to the turbine; and
a compressed air distribution controller configured to adjust the distribution ratio to adjusted values, the adjusted values determined based on measurement of the rotor speed by the rotor speed sensor and measurement of the turbine inlet temperature by the temperature sensor, and
wherein the control apparatus is configured to
   obtain a first of the adjusted values, by adjusting the first percentage to a first setting thereby supplying a first amount of the compressed air to the combustor, when the measurement of the turbine inlet temperature is lower than a preset value, and
   obtain a second of the adjusted values, by adjusting the first percentage to a second setting thereby supplying a second amount of the compressed air to the combustor when the measurement of the turbine inlet temperature reaches the preset value.

2. The control apparatus of claim 1, wherein the obtaining of the first of the adjusted values further includes raising the first percentage to the first setting and lowering the second percentage when the measurement of the rotor speed is below a rated rotor speed, the rated rotor speed being the rotor speed occurring when the system frequency is equal to a rated frequency.

3. The control apparatus of claim 1, wherein the first amount of the compressed air corresponds to an amount supplied in a state where the rotor speed is equal to a rated rotor speed, the rated rotor speed being the rotor speed occurring when the system frequency is equal to a rated frequency.

4. The control apparatus of claim 3, wherein in the obtaining of the first of the adjusted values the first setting is an adjusted percentage A1, the second percentage becomes an adjusted percentage B1, wherein $$A1 = A\frac{N_N}{N_C} \text{ and } B1 = B - A\left(\frac{N_N}{N_C} - 1\right)$$

respectively, where $N_N$ denotes the rated rotor speed, $N_C$ denotes the measurement of the rotor speed as measured by the rotor speed sensor, and A and B denote values of the first percentage and the second percentage, respectively, when the rotor speed is equal to the rated rotor speed.

5. The control apparatus of claim 3, wherein in the obtaining of the second of the adjusted values the second setting is an adjusted percentage A1, the second percentage becomes an adjusted percentage B1, wherein $$A1 = A\frac{N_N}{N_C}(1+\delta) \text{ and } B1 = B - A\left(\frac{N_N}{N_C}(1+\delta) - 1\right)$$

respectively, where $N_N$ denotes the rated rotor speed, $N_C$ denotes the measurement of the rotor speed as measured by the rotor speed sensor, $\delta$ denotes a preset speed regulation ratio, and A and B denote values of the first percentage and the second percentage, respectively, when the rotor speed is equal to the rated rotor speed.

6. The control apparatus of claim 3, wherein in the obtaining of the second of the adjusted values the second setting is an adjusted percentage A1, and the second percentage becomes an adjusted percentage B1, wherein $$A1 = A\frac{N_N}{N_C}\left(1 + \frac{P_2 - P_1}{P_1}\right) \text{ and } B1 = B - A\left[\frac{N_N}{N_C}\left(1 + \frac{P_2 - P_1}{P_1}\right) - 1\right]$$

respectively, where $N_N$ denotes the rated rotor speed, $N_C$ denotes the measurement of the rotor speed as measured by the rotor speed sensor, $P_1$ denotes power of the power generator at the rated frequency, $P_2$ denotes power that the power generator needs to generate in order to adjust a speed regulation ratio when the rotor speed changes from $N_N$ to $N_C$, and A and B denote values of the first percentage and the second percentage, respectively, when the rotor speed is equal to the rated rotor speed.

7. The control apparatus of claim 1, further comprising:
a fuel amount controller configured to control an amount of the fuel supplied to the combustor.

* * * * *